United States Patent
Kuster et al.

(10) Patent No.: US 11,011,001 B2
(45) Date of Patent: May 18, 2021

(54) METHOD AND DEVICES FOR CONFIGURING ACCESS CONTROL DEVICES AT AN INSTALLATION SITE

(71) Applicant: dormakaba Switzerland Ltd, Wetzikon (CH)

(72) Inventors: Christian Kuster, Wernetshausen (CH); Patrik Alessi, Frauenfeld (CH)

(73) Assignee: DORMAKABA SWITZERLAND LTD, Wetzikon (CH)

( * ) Notice: Subject to any disclaimer, the term of this patent is extended or adjusted under 35 U.S.C. 154(b) by 0 days.

(21) Appl. No.: 16/309,894

(22) PCT Filed: May 30, 2017

(86) PCT No.: PCT/EP2017/025152
§ 371 (c)(1),
(2) Date: Dec. 13, 2018

(87) PCT Pub. No.: WO2017/215788
PCT Pub. Date: Dec. 21, 2017

(65) Prior Publication Data
US 2020/0098216 A1    Mar. 26, 2020

(30) Foreign Application Priority Data
Jun. 14, 2016    (CH) .................... 00757/16

(51) Int. Cl.
*G07C 9/00* (2020.01)
*G07C 9/29* (2020.01)
*H04L 29/08* (2006.01)

(52) U.S. Cl.
CPC ..... *G07C 9/00944* (2013.01); *G07C 9/00857* (2013.01); *G07C 9/00896* (2013.01);
(Continued)

(58) Field of Classification Search
CPC ....................................................... G07C 9/29
See application file for complete search history.

(56) References Cited

U.S. PATENT DOCUMENTS 5,339,417 A * 8/1994 Connell ............. G06F 9/45558
                                                                        712/244
5,955,947 A * 9/1999 Sutsos ..................... G07C 9/28
                                                                     340/5.21
(Continued)

FOREIGN PATENT DOCUMENTS

EP           2701124 A1    2/2014
WO    WO 2010/039598 A2    4/2010
(Continued)

OTHER PUBLICATIONS

International Search Report and Written Opinion of the International Searching Authority for International Application No. PCT/EP2017/025152, dated Sep. 26, 2017, in 11 pages.

*Primary Examiner* — K. Wong
(74) *Attorney, Agent, or Firm* — Knobbe, Martens, Olson & Bear, LLP

(57) ABSTRACT

For configuring and installing access control devices at an installation site, configuration data for unidentified access control devices of the installation site is stored (S10) in a cloud-based computer system (1). The cloud-based computer system (1) receives (S2) a registration assigning the installation site to a media identifier stored in a setup media device. A particular one of the access control devices (4) at the installation site reads (S40) the media identifier stored in the setup media device (5). The media identifier from the particular access control device (4) is received (S5) in the cloud-based computer system (1). In the cloud-based computer system (1), the particular access control device (4) is mapped to one of the unidentified access control devices of the installation site. The configuration data of the mapped (Continued)

access control device is transmitted (S80) from the cloud-based computer system (1) to the particular access control device (4).

15 Claims, 2 Drawing Sheets

(52) U.S. Cl.
CPC .............. *G07C 9/29* (2020.01); *H04L 67/125* (2013.01); *G07C 2009/0088* (2013.01); *G07C 2009/00865* (2013.01)

(56) References Cited

U.S. PATENT DOCUMENTS

| | | | |
|---|---|---|---|
| 9,058,702 B2 * | 6/2015 | Chao | H04W 12/08 |
| 9,811,960 B2 * | 11/2017 | Voss | G07C 9/27 |
| 9,870,665 B2 * | 1/2018 | Maiwand | G07C 9/00896 |
| 10,049,516 B2 * | 8/2018 | Padgett | G07C 9/27 |
| 2015/0221149 A1 * | 8/2015 | Main | G06Q 20/322 |
| | | | 340/5.61 |
| 2017/0228953 A1 * | 8/2017 | Lupovici | G07C 9/00309 |

FOREIGN PATENT DOCUMENTS

| | | |
|---|---|---|
| WO | WO 2014/044832 A1 | 3/2014 |
| WO | WO 2015/177020 A1 | 11/2015 |

* cited by examiner

METHOD AND DEVICES FOR CONFIGURING ACCESS CONTROL DEVICES AT AN INSTALLATION SITE

CROSS-REFERENCE TO RELATED APPLICATIONS

This application is the U.S. National Phase under 35 U.S.C. § 371 of International Application PCT/EP2017/025152, filed May 30, 2017, which claims priority to CH Application No. 00757/16, filed Jun. 14, 2016.

FIELD OF THE INVENTION

The present invention relates to a method and devices for configuring access control devices at an installation site. Specifically, the present invention relates to a method, a computer system, and an access control device for configuring and installing access control devices at an installation site.

BACKGROUND OF THE INVENTION

Access control devices that control access to restricted areas closed off by doors are separate units which are connected to the doors on the site where the door is installed. Typically, the access control devices include an electromechanical locking device and an access controller controlling the locking device. The access controller may include a keyboard for entering a passcode and/or a card reader for reading identification and/or authorisation information from a user's card through an RFID (Radio Frequency IDentification), magnetic, or contact-based interface. Unfortunately, different types and sizes of doors or gates have different connection interfaces and require different control signals. Unless, an access control device is pre-configured for a specific type of door or gate, the access control device needs to be configured on-site after it has been installed and connected to the door or gate. While pre-configuration of access control devices would make on-site configuration unnecessary, it requires laborious management of the pre-configured devices (the particular device must be at the right time at the right location with the right configuration and assignable to a specific door or gate) and is inflexible and error-prone. On the other hand, on-site, ad-hoc configuration of individual access control devices is extremely inefficient, particularly in buildings having a lot of restricted areas with different types of doors and gates.

EP 2701124 describes a method of configuring a lock control unit of an access control system. The lock control unit is associated with an electronic key and is configured for wireless communication with a mobile user unit. According to EP 2701124, prior to installing the lock control unit at a particular location, the lock control unit and the particular location are registered in the access control system. The lock control unit sends its lock control unit identifier to the mobile unit. An electronic key is requested from the access control system. The mobile unit communicates with the lock control unit and sends to the lock control unit the electronic key and optionally one or more parameters.

WO 2014/044832 describes a method and a system for the configuration of locking systems with electronic locks that communicate with passive RFID cards. According to WO 2014/044832, the electronic locks and the RFID cards are configured by way of smartphones. An administration app of the smartphone accesses a cloud service for storing centrally in the cloud data of the locking system and requesting key and programming data. The smartphone is then be used to transfer the key data and the programming data to the locking system and the RFID cards.

SUMMARY OF THE INVENTION

It is an object of this invention to provide a method and devices for configuring access control devices at an installation site, which method and devices do not have at least some of the disadvantages of the prior art. In particular, it is an object of the present invention to provide a method and devices for configuring access control devices at an installation site, which method and devices make possible efficient and flexible configuration of the access control devices.

According to the present invention, these objects are achieved through the features of the independent claims. In addition, further advantageous embodiments follow from the dependent claims and the description.

According to the present invention, the above-mentioned objects are particularly achieved in that for configuring and installing access control devices at an installation site, configuration data for unidentified access control devices of the installation site is stored in a cloud-based computer system. In the cloud-based computer system, received is a registration which assigns the installation site to a media identifier stored in a setup media device. A particular one of the access control devices at the installation site reads the media identifier stored in the setup media device. In the cloud-based computer system, the media identifier is received from the particular access control device. In the cloud-based computer system, the particular access control device is mapped to one of the unidentified access control devices of the installation site assigned to the media identifier. The configuration data of the unidentified access control device mapped to the particular access control device is transmitted from the cloud-based computer system to the particular access control device.

In an embodiment, storing the configuration data includes storing connectivity information for the access control devices and for hardware components connected to the access control devices.

In a further embodiment, storing the configuration data includes storing timing information for the access control devices and for controlling hardware components connected to the access control devices.

In an embodiment, a visual representation of the media identifier is arranged on a surface of the setup media device. Generating the registration includes reading the visual representation of the media identifier on the surface of the setup media device.

In a further embodiment, reading the media identifier stored in the setup media device includes placing the setup media device within a reception range of an RFID reader, and the RFID reader reading the media identifier from the setup media device.

In an embodiment, mapping of the particular access control device to one of the unidentified access control devices includes receiving in the cloud-based computer system a device identifier of the particular access control device, and receiving in the cloud-based computer system user instructions linking the device identifier of the particular access control device to one of the unidentified access control devices of the installation site assigned to the media identifier.

In a further embodiment, location information is received in the particular access control device from a mobile communication device, and mapping the particular access control device to one of the unidentified access control devices includes receiving in the cloud-based computer system the location information from the particular access control device, and using the location information for the mapping of the particular access control device to one of the unidentified access control devices.

In an embodiment, the particular access control device receives the configuration data from the cloud-based computer system and performs a configuration process using the configuration data.

In a further embodiment, an installation code is stored in the setup media device. The media identifier and the installation code of the setup media device are stored in the cloud-based computer system. The installation code is transmitted from the cloud-based computer system to a device controller gateway at the installation site. Access of a wireless access control device to the device controller gateway is controlled using the installation code stored in the setup media device and the installation code received in the device controller gateway.

In addition to a method of configuring and installing access control devices at an installation site, the present invention also relates to a computer system for configuring the access control devices at the installation site. The computer system comprises one or more processors configured to: store in the computer system configuration data for unidentified access control devices of the installation site; receive in the computer system a registration assigning the installation site to a media identifier stored in a setup media device; receive in the computer system the media identifier from a particular one of the access control devices at the installation site; map in the computer system the particular access control device to one of the unidentified access control devices of the installation site assigned to the media identifier; and transmit the configuration data of the unidentified access control device mapped to the particular access control device from the computer system to the particular access control device.

In an embodiment, the configuration data includes connectivity information for the access control devices and for hardware components connected to the access control devices.

In a further embodiment, the configuration data includes timing information for the access control devices and for controlling hardware components connected to the access control devices.

In an embodiment, the processors of the computer system are configured to receive, for mapping the particular access control device to one of the unidentified access control devices, a device identifier of the particular access control device, and user instructions linking the device identifier of the particular access control device to one of the unidentified access control devices of the installation site assigned to the media identifier.

In a further embodiment, the processors of the computer system are configured to receive, for mapping of the particular access control device to one of the unidentified access control devices, location information of the particular access control device, and to use the location information for mapping the particular access control device to one of the unidentified access control devices.

In an embodiment, the processors are configured to store the media identifier and an installation code stored in the setup media device; and to transmit the installation code to a device controller gateway at the installation site, for enabling control of access of a wireless access control device to the device controller gateway, using the installation code stored in the setup media device and the installation code transmitted to the device controller gateway.

In addition to a method and computer system for configuring and installing access control devices at an installation site, the present invention also relates to an access control device, comprising a circuit configured to: read from a setup media device a media identifier stored in the setup media device; transmit the media identifier and a device identifier of the access control device to a cloud-based computer system; in response to transmitting the media identifier and the device identifier to the cloud-based computer system, receive from the cloud-based computer system configuration data for the access control device; and perform a configuration process using the configuration data received from the cloud-based computer system.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
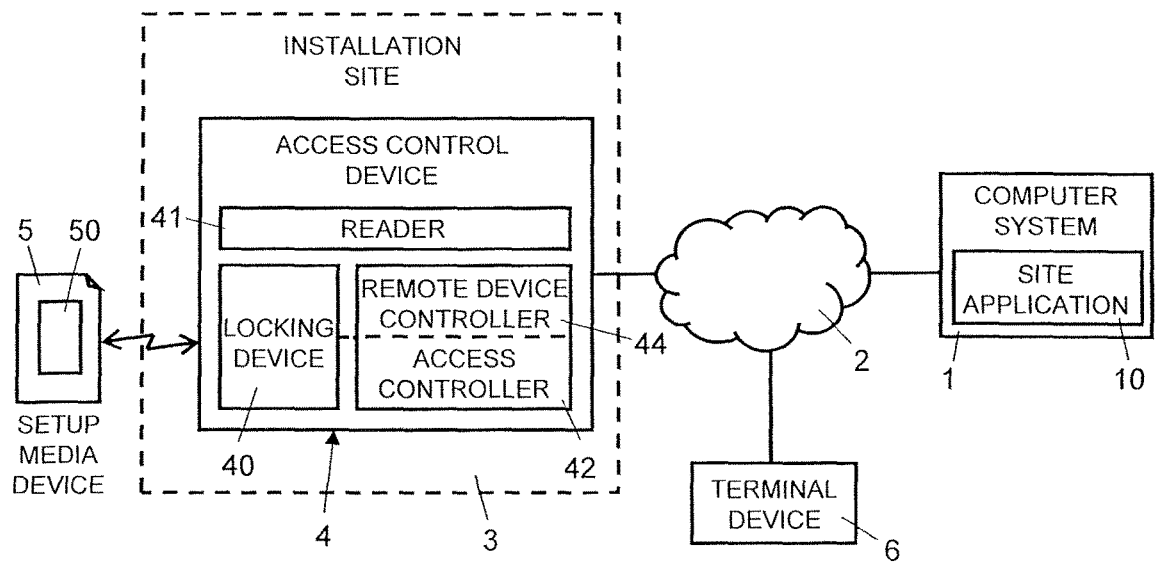
FIG. 1: shows a block diagram illustrating schematically an installation site with an access control device connected via a communication network to a (cloud-based) computer system.
Figure 2:
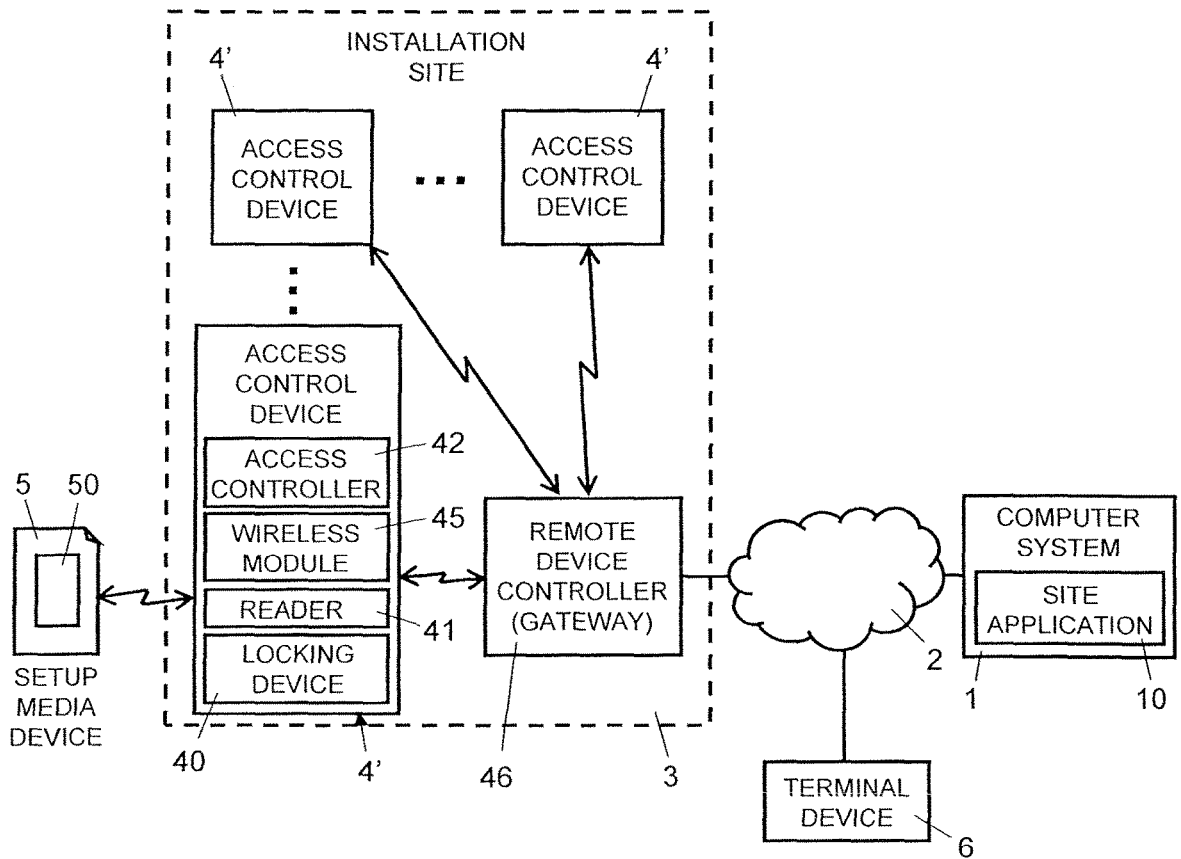
FIG. 2: shows a block diagram illustrating schematically an installation site with several access control devices connected via a gateway and a communication network to a (cloud-based) computer system.

In FIGS. 1 and 2, reference numeral 3 refers to an installation site for access control devices 4, 4'. The installation site 3 is a premise or a building, e.g. a public, private, or industrial building, with restricted areas such as rooms, floors, elevators, etc., which are closed off by doors, gates, etc. The doors or gates can be of different types, e.g. swinging doors, revolving doors, sliding doors, double sliding doors, etc., and of different size, make, and brand. The restricted areas or their doors or gates, respectively, are each secured with an access control device 4, 4'.

As illustrated in FIGS. 1 and 2, the access control devices 4, 4' include each a locking device 40, a reader 41, and an access controller 42. The locking device 40 is in a housing separate from the reader 41 and the access controller 42.

The locking devices 40 are electromechanical devices of various types which are connected through wired connections to the access controller 42 of the respective access control device 4, 4'.

The access controllers 42 include electronic circuits configured to perform various functions, as described later in more detail. The electronic circuits of the access controllers 42 include programmable processors with data and program memory for storing configuration data and programmed software modules for controlling the processors.

The readers 41 are connected to the access controller 42 of the respective access control device 4, 4'. The readers 41 include electronic circuits and an antenna configured to read data via a wireless data communication interface from a media device 5. The readers 41 are configured as RFID readers to read data stored in a data storage 50 of media devices 5 which are implemented as RFID (Radio Frequency Identifier) cards or transponders.

Using the connected reader 41, the access controller 42 is configured to read and receive data from the data storage 50 of a media device 5 placed within its reception range. If the media device 5 is a user identification card, the access controller 42 processes user identification information stored in the data storage 50 to determine whether the respective user is authorized to access the restricted area secured by the respective access control device 4, 4' (e.g. based on access rights, white lists, and/or black lists stored in the access controller 42). If the user is authorized, the access controller 42 generates control signals for the locking device 40 to open the respective door or gate. Otherwise, the access controller 42 generates control signals to indicate to the user that access is denied, e.g. via an optical and/or acoustical signalling interface.

In the embodiment of FIG. 1, the access control device 4 further comprises a remote device controller 44 connected to the access controller 42. The remote device controller 44 comprises an electronic circuit configured to exchange data with a remote computer system 1 via a communication network 2. Specifically, the communication network 2 includes the Internet and the computer system 1 is a cloud-based computer system. Depending on embodiment and/or configuration, the communication network 2 further includes a LAN (Local Area Network), WLAN (Wireless LAN), and/or a mobile radio network, such as a GSM (Global System for Mobile Communication) or UMTS (Universal Mobile Telephone System), for accessing the cloud-based computer system 1 via the Internet. In an embodiment, communication between the remote device controller 44 and the cloud-based computer system 1 is implemented as an IoT (Internet of Things) stack over TCP/IP (Transmission Control Protocol/Internet Protocol).

The cloud-based computer system 1 comprises a plurality of computers, each computer having one or more processors, connected to a data storage system (e.g. a disk array). The cloud-based computer system 1 further comprises a site planning and installation application 10. The site planning and installation application 10, in short "site application" 10, is a software program configured to control the processors of the cloud-based computer system 1 to perform various functions described below in more detail.

In the embodiment of FIG. 2, the installation site 3 further comprises a remote device controller 46 which is configured as a wireless gateway between the wireless access control devices 4' and the cloud-based computer system 1. Accordingly, in the embodiment of FIG. 2, the access control devices 4' further comprise a wireless module 45 configured for wireless data communication with the remote device controller gateway 46. For example, the wireless module 45 and the remote device controller (gateway) 46 are configured for data communication according to the ZigBee (IEEE 802.15.4-based) specification or Bluetooth. The remote device controller (gateway) 46 is further configured for data communication with the remote computer system 1 via a communication network 2, as described above in the context of the remote device controller 44 of FIG. 1.

In FIGS. 1 and 2, reference numeral 6 refers to a terminal device connected to the communication network 2. For example, the terminal device 6 is a personal computer, a tablet computer, or a smart phone, or another mobile communication device configured for data communication with the remote computer system 1 via the communication network 2. The terminal device 6 is configured to access and interact with the site application 10, as described in more detail below. For interacting with the site application 10, the terminal device 6 comprises local program application, e.g. a browser, a client application, and/or a so called app.

Figure 3:
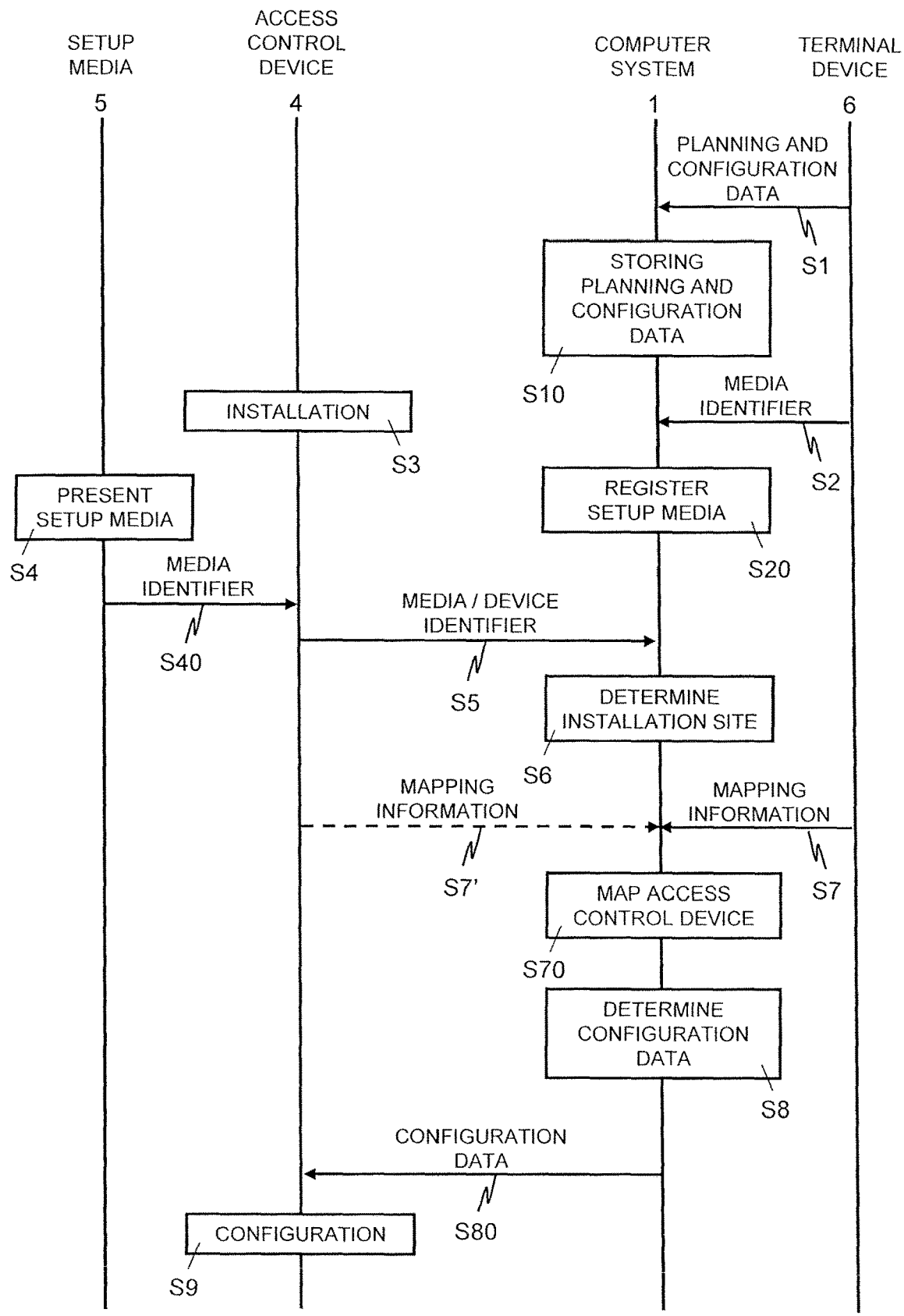
FIG. 3: shows a flow diagram illustrating an exemplary sequence of steps for configuring and installing access control devices at an installation site.

In the following paragraphs, described with reference to FIG. 3 are possible sequences of steps for configuring and installing access control devices 4, 4' at an installation site 3.

In step S1, a user uses a terminal device 6 to access and use the site application 10 at the cloud-based computer system 1. Specifically, the user uses the site application 10 for planning and configuring an installation site 3 with one or more access control devices 4, 4'. As illustrated schematically in FIG. 3, in step S1, planning and configuration data for a specific installation site 3 is transmitted from the terminal device 6 to the cloud-based computer system 1. The configuration data determines the location of one or more access control devices 4, 4' with respect to a floor plan of the installation site 3. The access control devices 4, 4' are defined with respect to their particular types and in context with their respectively connected hardware components, e.g. type, size, make of door or gates, etc. However, the access control devices 4, 4' remain unidentified, i.e. the planning and configuration data does not define a specific physical unit by way of a unique equipment number or unit identifier. In other words, the configuration data or plan of the installation site 3 includes logical representations of the access control devices 4, 4'.

In step S10, the site application 10 stores at the cloud-based computer system 1 the received planning and configuration data for the respective installation site 3. In an embodiment, finalizing the planning and configuration data for a particular installation site 3 triggers an ordering or manufacturing process for producing the required types of access control devices 4, 4'. Other than the required types and number of units, the manufacturing of these access control devices 4, 4' is executed, without taking into consideration any configuration data specified by the user in step S1; in other words, the access control devices 4, 4' are manufactured generically, without any customization or personalization.

In step S2, the setup media device 5, which will be used at the actual installation site 3 for installing and setting up the access control system, is registered at the site application 10 of the cloud-based computer system 1. Specifically, a media identifier stored in the data storage 50 of the setup media device 5 is communicated to the site application 10 of the cloud-based computer system 1 in connection with the installation site 3. For that purpose, the media identifier stored in the setup media device 5 is read by way of an RFID reader, or a visual representation of the media identifier provided and arranged on the surface of the setup media device 5 is read and communicated to the site application 10 at the cloud-based computer system 1. Depending on the embodiment and/or configuration, the visual representation of the media identifier is an alphanumeric code which is entered manually by the user, or a barcode or QR code which is scanned by the user by way of a scanner or a scanning app of the terminal device 6.

In step S20, the site application 10 registers the setup media device 5 by storing at the cloud-based computer system 1 the received media identifier assigned to the specified installation site 3.

In step S3, a user physically installs the specified types of access control devices 4, 4' at the actual installation site 3 according to the defined plan and configuration. Specifically, the determined locking devices 40 are connected to their respective doors or gates, the access controllers 42 and readers 41 are mounted, the access controllers 42 are wired to their locking devices 40, and connections to a power supply is established. Moreover, the remote device controllers 44 and remote device controller gateways 46 are connected to the communication network 2.

In step S4, a user commences to configure and set up the physically installed access control devices 4, 4' at the installation site 3. Specifically, the user presents the setup media device 5 registered for the installation site 3 to a reader 41 of one of the installed access control devices 4, 4'.

In step S40, the reader 41 performs a reading operation and the media identifier of the registered setup media device 5 is transmitted to the reader 41 of the respective access control device 4, 4'.

In step S5, the media identifier of the registered setup media device 5 is transmitted from the respective access control device 4, 4' via the communication network 2 to the cloud-based computer system 1. As indicated schematically in FIG. 3, the respective access control device 4, 4' further transmits to the cloud-based computer system 1 a unique device identifier of the access control device 4, 4' or its locking device 40, respectively (not necessarily at the same time as the media identifier). In the embodiment according to FIG. 1, communication between the access control device 4 and the cloud-based computer system 1 is executed by the remote device controller 44 via the communication network 2. In the embodiment according to FIG. 2, communication between the access control device 4' and the cloud-based computer system 1 is executed through the remote device controller gateway 46. Thus, the media identifier read by the reader 41 and the unique device identifier of the access control device 4' or its locking device 40, respectively, are transmitted by the wireless module 45 to the remote device controller gateway 46; from the remote device controller gateway 46 the media identifier and the unique device identifier are transmitted to the cloud-based computer system 1.

In the embodiment according to FIG. 2, further steps are performed for authorizing communication between the wireless module 45 of the respective access control device 4' and the remote device controller gateway 46. For that purpose, in addition to the media identifier, the setup media device 5 further has stored therein securely an installation code (non-readable by an external unit). The installation code is generated as a secret, random code and stored in the data storage 50 of setup media device 5 as part of the manufacturing process. The installation code of the setup media device 5 is also stored at the cloud-based computer system 1. When the remote device controller gateway 46 receives the media identifier from the wireless module 45 (step S5), the remote device controller gateway 46 obtains from the cloud-based computer system 1 the installation code assigned to the received media identifier. For checking authenticity of the access control device 4', the remote device controller gateway 46 verifies that the installation code received from the cloud-based computer system 1 corresponds (matches) the installation code stored in the setup media 5 presented to the reader 41 of the respective access control device 4', before any further communication is permitted. For example, verification of the installation code is performed, using known cryptographic algorithms, e.g. an asymmetric key pair (PKI) stored in the setup media 5.

In step S6, the site application 10 at the cloud-based computer system 1 determines the installation site 3 assigned to and defined by the media identifier received in step S5.

In step S7 or S7', respectively, the site application 10 at the cloud-based computer system 1 receives mapping information which enables the mapping of the actual physical access control device 4, 4' to a corresponding unidentified access control device included in the plan of the specific installation site 3 identified in step S5. In the embodiment of step S7, the mapping information is transmitted from the terminal device 6 to the site application 10 at the cloud-based computer system 1. In the embodiment of step S7', the mapping information is transmitted from the respective access control device 4, 4' to the site application 10 at the cloud-based computer system 1. Thus, the actual physical access control device 4, 4' is mapped or assigned to its corresponding (thus far unidentified) logical representation in the plan of the respective installation site 3. The mapping or matching of the actual physical access control device 4, 4' to its corresponding logical representation in the plan of the respective installation site 3 is performed through a pairing process. For example, the mapping information includes location information related to the location of the actual physical access control device 4, 4' at the installation site 3. The site application 10 at the cloud-based computer system 1 uses the location information for mapping the actual physical access control device 4, 4' to its corresponding logical representation in the plan of the respective installation site 3. For example in an embodiment of step S7, the user uses the terminal device 6 to communicate to the site application 10 a selection or indication of the logical representation of the access control device in the plan that matches the actual access control device 4, 4' that the user is presently configuring. For example, when the user is configuring the access control device 4, 4' located at a certain position/location in the building, the user will indicate or select in a graphical representation of the plan of the installation site 3 the logical representation of the access control device that is shown in the same position/location. Alternatively, in the embodiment of step S7', the user uses an operating element of the access control device 4, 4', e.g. a button, to communicate or signal to the site application 10 that the actual access control device 4, 4' that the user is presently configuring matches the logical representation of the access control device that is currently highlighted by the site application 10 in the graphical representation of the plan of the installation site 3 shown to the user on terminal device 6. In a further embodiment, when it is in proximity of the access control device 4, 4', the terminal device 6 transmits to the access control device 4, 4' (via the reader 41 or the wireless module 45) current location information of the terminal device 6. The location information is obtained from a GPS receiver of the terminal device 6 and/or through (descriptive) data entry from the user. The location information is stored in the access control device 4, 4' and transmitted from the access control device 4, 4' to the cloud-based computer system 1 where it is used for mapping the respective access control device 4, 4' to the logical representation of the access control device, using location information stored in the cloud-based computer system 1 for the logical representation of the access control device.

In step S70, the site application 10 at the cloud-based computer system 1 performs the mapping of the actual physical access control device 4, 4' to the corresponding logical representation of the access control device in the plan of the installation site 3. Specifically, the site application 10 at the cloud-based computer system 1 stores the unique device identifier of the access control device 4, 4' or its locking device 40, respectively, assigned to the corresponding logical representation of the access control device in the plan of the installation site 3.

In step S8, the site application 10 determines the configuration data stored in the cloud-based computer system 1 for the access control device that is (now identified and) mapped to the actual physical access control device 4, 4' at the installation site 3.

In step S80, the site application 10 transmits the configuration data to the actual physical access control device 4, 4' at the installation site 3.

In the embodiment according to FIG. 1, the configuration data is transmitted from the cloud-based computer system 1 via the communication network 2 to the remote device controller 44 of the respective access control device 4. In the embodiment according to FIG. 2, the configuration data is transmitted from the cloud-based computer system 1 via the communication network 2 to the remote device controller gateway 46 of the respective installation site 3, and from the remote device controller gateway 46 in wireless fashion to the wireless module 45 of the respective access control device 4'. Thus, the configuration data is transmitted from the cloud-based computer system 1 to the remote device controller gateway 46 of the respective the installation site 3; from the remote device controller gateway 46, the configuration data is transmitted to the wireless module 45 of the respective access control device 4'.

In step S9, the access controller 42 of the respective access control device 4, 4' completes the configuration of the access control device 4, 4' by performing a configuration process using the received configuration data. The received configuration data is stored and implemented by the access controller 42. Specifically, depending on the specified type of access control device 4, 4', respective locking device 40, and specified connected hardware components, the configuration data includes connectivity and timing information. The connectivity information indicates which connection ports of the access controller 42 are connected to which corresponding connection ports of the locking device 40, door or gate actuators, signalling devices, and other hardware elements of the specified door or gate. The timing information defines timing of control signals generated by the access controller 42 to control hardware elements connected to the access controller 42, e.g. signalling times, time durations and timing courses of control signals for the locking device 40, electromechanical relays, door or gate actuators, optical and/or acoustical signalling units, etc.

Furthermore, the configuration data includes firmware, i.e. executable program instructions, for the access controller 42, reader 41, and/or wireless module 45 of the access control device 4, 4'. The firmware includes program modules with updates for firmware already installed in the access control device 4, 4', and/or additional program modules required for controlling the hardware elements specified in the configuration of the access control device 4, 4'.

Moreover, the configuration data may further include access control information. The access control information includes white lists, black lists, and/or access rights for identified users and defined time periods.

At this point it should be pointed out that the configuration data for a particular installation site 3 further includes configuration data, such as firmware and configuration parameters, for the remote device controller 44 and/or the remote device controller gateway 46, respectively. The configuration data is stored and used in a configuration process at the remote device controller 44 and/or the remote device controller gateway 46, respectively.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A method of configuring and installing a plurality of access control devices at an installation site, the method comprising:
   storing in a cloud-based computer system configuration data for a plurality of unidentified access control devices associated with the installation site, wherein each of the plurality of unidentified access control devices is configured to be assigned to one of the plurality of access control devices at the installation site;
   receiving in the cloud-based computer system a registration assigning the installation site to a media identifier stored in a setup media device;
   reading by a particular one of the access control devices of the plurality of access control devices at the installation site the media identifier stored in the setup media device;
   receiving in the cloud-based computer system the media identifier from the particular access control device;
   assigning, in the cloud-based computer system the particular access control device at the installation site to one of the unidentified access control devices associated with the installation site assigned to the media identifier; and
   transmitting the configuration data of the unidentified access control device assigned to the particular access control device from the cloud-based computer system to the particular access control device.

2. The method of claim 1, wherein storing the configuration data includes storing connectivity information for the access control devices and for hardware components connected to the access control devices.

3. The method of claim 1, wherein storing the configuration data includes storing timing information for the access control devices and for controlling hardware components connected to the access control devices.

4. The method of claim 1, wherein the method further comprises arranging a visual representation of the media identifier on a surface of the setup media device; and generating the registration includes reading the visual representation of the media identifier on the surface of the setup media device.

5. The method of claim 1, wherein reading the media identifier stored in the setup media device includes placing the setup media device within a reception range of an RFID reader, and the RFID reader reading the media identifier from the setup media device.

6. The method of claim 1, wherein assigning of the particular access control device to one of the unidentified access control devices includes receiving in the cloud-based computer system a device identifier of the particular access control device, and receiving, in the cloud-based computer system, user instructions linking the device identifier of the particular access control device to one of the unidentified access control devices of the installation site assigned to the media identifier.

7. The method of claim 1, wherein the method further comprises receiving, in the particular access control device, location information from a mobile communication device; and assigning the particular access control device to one of the unidentified access control devices includes receiving in the cloud-based computer system the location information from the particular access control device, and using the location information for the assignment of the particular access control device to one of the unidentified access control devices.

8. The method of claim 1, wherein the method further comprises storing an installation code in the setup media device; storing in the cloud-based computer system the media identifier and the installation code of the setup media device;
transmitting the installation code from the cloud-based computer system to a device controller gateway at the installation site; and controlling access of a wireless access control device to the device controller gateway, using the installation code stored in the setup media device and the installation code received in the device controller gateway.

9. A computer system for configuring a plurality of access control devices at an installation site, the computer system comprising one or more processors configured to:
store in the computer system configuration data for a plurality of unidentified access control devices associated with the installation site;
receive in the computer system a registration assigning the installation site to a media identifier stored in a setup media device;
receive in the computer system the media identifier from a particular one of the plurality of access control devices at the installation site;
assign, in the computer system the particular access control device at the installation site to one of the unidentified access control devices associated with the installation site assigned to the media identifier; and
transmit the configuration data of the unidentified access control device assigned to the particular access control device from the computer system to the particular access control device.

10. The computer system of claim 9, wherein the configuration data includes connectivity information for the access control devices and hardware components connected to the access control devices.

11. The computer system of claim 9, wherein the configuration data includes timing information for the access control devices and for controlling hardware components connected to the access control devices.

12. The computer system of claim 9, wherein the processors are configured to receive, for assigning the particular access control device to one of the unidentified access control devices, a device identifier of the particular access control device, and user instructions linking the device identifier of the particular access control device to one of the unidentified access control devices of the installation site assigned to the media identifier.

13. The computer system of claim 9, wherein the processors are configured to receive, for assigning of the particular access control device to one of the unidentified access control devices, location information of the particular access control device, and to use the location information for assigning the particular access control device to one of the unidentified access control devices.

14. The computer system of claim 9, wherein the processors are configured to store the media identifier and an installation code stored in the setup media device; and to transmit the installation code to a device controller gateway at the installation site, for enabling control of access of a wireless access control device to the device controller gateway, using the installation code stored in the setup media device and the installation code transmitted to the device controller gateway.

15. An access control device, comprising a circuit configured to:
read from a setup media device a media identifier stored in the setup media device;
transmit the media identifier and a device identifier of the access control device to a cloud-based computer system;
in response to transmitting the media identifier and the device identifier to the cloud-based computer system, receive from the cloud-based computer system, configuration data for the access control device; and
perform a configuration process using the configuration data received from the cloud-based computer system.

* * * * *